March 26, 1929.  J. E. MALONE  1,706,534
MACHINE FOR CUTTING AND DELIVERING ICE
CREAM AND LIKE PLASTIC MATERIALS
Filed Jan. 22, 1926   6 Sheets-Sheet 1

Inventor
John E. Malone
by  J. Daniel Stuwe
Attorney.

March 26, 1929.  J. E. MALONE  1,706,534
MACHINE FOR CUTTING AND DELIVERING ICE
CREAM AND LIKE PLASTIC MATERIALS
Filed Jan. 22, 1926  6 Sheets-Sheet 4

Inventor
John E. Malone
by J. Daniel Stuwe
Attorney.

March 26, 1929. J. E. MALONE 1,706,534
MACHINE FOR CUTTING AND DELIVERING ICE
CREAM AND LIKE PLASTIC MATERIALS
Filed Jan. 22, 1926 6 Sheets-Sheet 5

Inventor
John E. Malone
by J. Daniel Stuwe
Attorney.

March 26, 1929.  J. E. MALONE  1,706,534
MACHINE FOR CUTTING AND DELIVERING ICE
CREAM AND LIKE PLASTIC MATERIALS
Filed Jan. 22, 1926   6 Sheets-Sheet 6

Inventor
John E. Malone
by J. Daniel Stuwe
Attorney.

Patented Mar. 26, 1929.

1,706,534

UNITED STATES PATENT OFFICE.

JOHN E. MALONE, OF OAK PARK, ILLINOIS, ASSIGNOR TO MOJONNIER BROS. CO., A CORPORATION OF ILLINOIS.

MACHINE FOR CUTTING AND DELIVERING ICE CREAM AND LIKE PLASTIC MATERIALS.

Application filed January 22, 1926. Serial No. 82,925.

My invention relates to a machine for handling ice cream and like plastic materials; and the main object is to provide such a machine having adjustable means for taking a predetermined quantity or portion from a mass of material and feeding or depositing it at a delivery point as, for example, into a carton; and another object is to provide operating means for actuating various parts of the machine so as to move said parts in proper sequence to separate and feed the material as required. I also show carton closing means but do not claim the same herein.

Other objects and advantageous ends accomplished with this invention will become apparent from the following description taken in connection with the accompanying drawings forming a part of this application, and in which.

In the drawings I have illustrated a particular form of my invention, and this form comprises in a general way, means for conveying or moving a plurality of cartons in spaced relation; means for containing a mass or quantity of material, such for instance, as ice cream in blocks, as illustrated; adjustable means for cutting or separating a predetermined portion or quantity from said mass of material; means for conveying and discharging or feeding said portion of material into a carton, means for closing the covering elements of said carton, such as the end flaps and main top; and power transmission means or operating mechanism for automatically driving and operating all of said means in proper sequence and order, so as to separate the predetermined portion from the mass and to feed it into the carton, and thereupon carry said carton forward to the closing means, after adding a spoon to said portion in the carton, then close the covering elements of the carton, and thereafter discharge said carton from the machine.

The means for conveying and intermittently moving the carton and placing each carton in succession in line with the material separating and feeding means, comprises a horizontal frame 15 mounted transversely across one end of the housing 16 which is supported on legs 17 braced by means of cross bars 18. The frame 15 includes track members 15' and 15'' which are provided with downwardly curved ends 19 at one end and with downwardly curved ends 20 at the other end. A sprocket 21 is rotatably mounted by means of a shaft 22 in said curved ends 19, and a sprocket 23 is mounted to rotate with a shaft 24 in bearing blocks 25 adjustably positioned in slots 26 provided in the curved ends 20, said blocks being adjusted by means of screws 27 to provide the proper tension in the carton conveying chain 28 which travels on said sprockets 19 and 20 and on track members 15' and 15''. Said chain 28 is provided with cross members or spacing blocks 29 placed at certain predetermined distances apart on the chain, so as to carry a carton 30 in each space between each two adjacent blocks, as shown in the drawings. The cartons 30 are thus conveyed or carried forward in spaced relation on said chain; and are thereby moved intermittently in position in line with the material feeding means for receiving a portion of material, and for conveying the cartons step by step over the frame 15 and through the machine.

Figure 12:
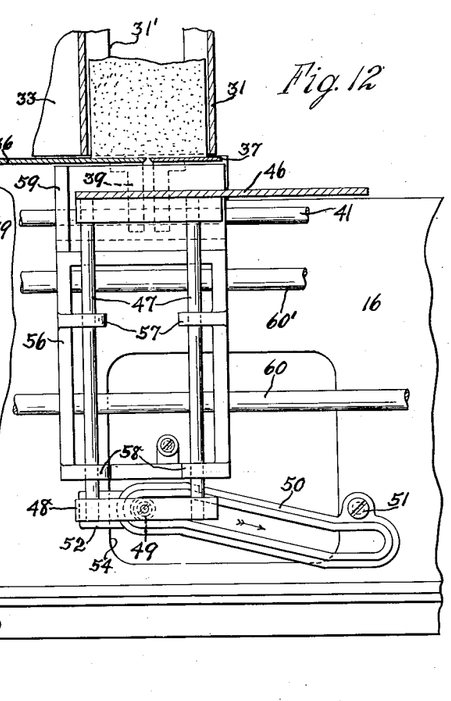
Fig. 12 is a vertical section on line 12—12 of Fig. 11, showing the mechanism for separating and conveying a portion from the mass of material, and showing the means for adjusting said mechanism.

The means for containing the mass or quantity of material comprises a casing or container 31 which is preferably made of such a size and shape as to best suit the material which is to be contained therein and conveyed therefrom into the carton, and this casing is mounted on housing 16, (see Fig. 4) as with brackets 32 and with suitable fastening means, and if desired may be arranged so that the casing may be replaced by one of a different size or shape to suit the particular material or the particular cartons to be filled. The particular casing 31 shown in the drawings is shaped and adapted for supporting blocks or bricks of ice cream or the like at one end thereof, and said blocks are preferably arranged in upright position in said end, while a side opening 31′ is provided on said end for viewing the blocks of material. A part 33 of the casing is arranged for containing ice to cool said blocks of ice cream, and has a sloping bottom 33′ and a drain opening or port 34 at the lower end. Said block-holding end is open at the bottom, (see Fig. 12) to admit or feed the block of material to the cutting or separating mechanism to separate a certain portion from the lower end of the block. A suitable cover 35 is preferably also provided for the top of said casing or container.

The means for separating or cutting a predetermined portion of material from the mass of material in the casing, as for instance, a portion from a block of ice cream which is located in the end part of the casing, and the means for supporting and conveying said portion of material, comprises a pair of companion knives, one broad knife 36 and another narrow knife 37 (see Figs. 9–12), the broad knife being movably supported by brackets 38 and 39 which slide respectively on the guide rods 40 and 41 secured in housing 16, and the narrow knife being supported by brackets 42 and 43 which likewise slide on said rods 40 and 41, the brackets 38 and 42 each having two hands embracing guide rod 40 as shown in the drawings. The brackets 38 and 42 are each provided respectively, with a depending arm 38′ and 42′, which, respectively, carry a roller 38″ and 42″ thereon. These rollers travel closely together along a straight slot or groove 44′ (see Figs. 7 and 8) provided in the periphery of a drum 44 which is rotatably mounted with its drive shaft 45 journaled with suitable bearings in housing 16, thereby keeping the knives 36 and 37 in close contact or in closed position, during the larger part of the rotation of said drum; but two diverging slots or branches 44″, which are arranged substantially in diamond shape, are provided within the straight groove or slot 44′, and when said rollers travel within said diamond shaped slot, the knives are separated to permit the downward movement of the material, like the block of ice cream as shown in the drawings, so that a portion thereof may be cut off or separated by the following closing movement of the knives as the rollers again move from the branches 44″ into the straight slot 44′.

The means for conveying the portion of material from the casing or container 31 and placing it into the carton comprises a supporting plate or platform 46 resting on vertical shafts 47 which are supported on a cross beam 48 provided with a side stem 49 which travels in an inclined track means 50 during the movement of the platform from the container 31 to the carton 30. Said track means is fulcrumed at its lower end on the housing 16 with a screw 51 or the like, which is selectively placed or fastened at such elevation as to bring the platform, when in its discharging position, exactly in line with the top of the carton, and the upper end of said platform is adjustably mounted in position by means of a clamping jaw 52 (see Figs. 4 and 11) with a set screw 53 thereon for clamping the edge of the housing wall in the side opening 54, and said jaw is movable along and gaged by a series of index numbers 55, whereby the elevation of the platform during its receiving position, and consequently the thickness of the slice or portion of material, is controlled and regulated, said slice or portion being thereafter cut from the block by the knives 36 and 37 and then conveyed to the carton.

Means for moving the platform longitudinally between the casing and carton comprises a vertical rectangular frame 56 having projecting ears 57 and 58 in which the shafts 47 slide vertically and whereby said shafts and platform are moved horizontally. On the top of said frame is mounted a U-shaped member 59 which surrounds the receiving part of platform 46, and surrounds and guards the portion of material on said platform which has been cut from the mass of material. Said frame 56 is supported and slidable on horizontal guide rods 60 and 60′, mounted in housing 16, and an arm 61 on said frame carries a roller 62 which moves in a curved slot 63 provided in the periphery of rotating drum 44, thereby moving frame 56 and platform 46 to and fro between the casing and carton.

Figure 4:
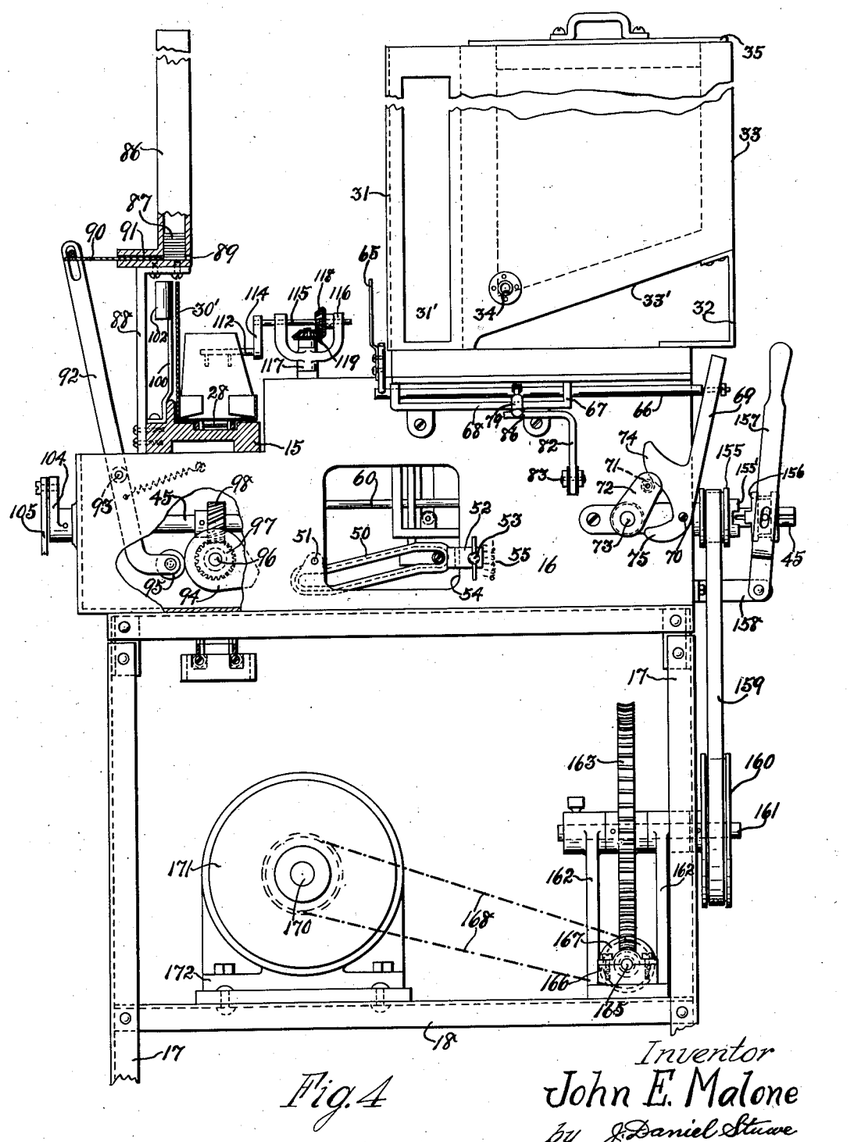
Fig. 4 is an enlarged vertical cross-section on line 4—4 of Fig. 1.
Figure 10:
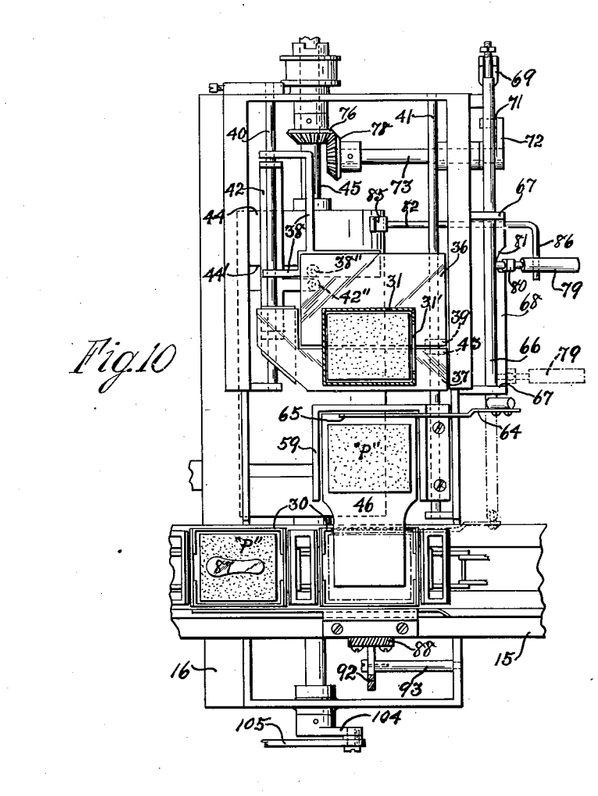
Fig. 10 is a partial plan of the mechanism for feeding the material into the carton, and shows the knives close together.
Figure 11:
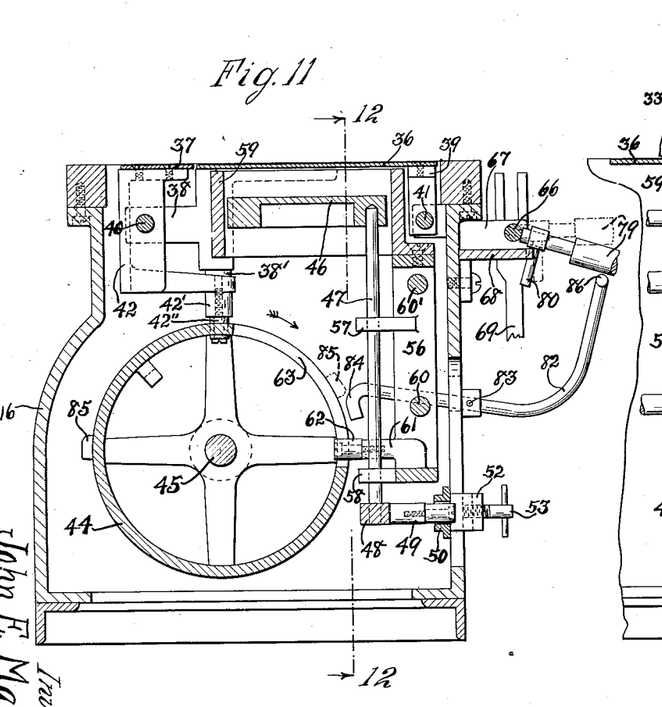
Fig. 11 is an enlarged vertical section through the drum and feeding mechanism on line 11—11 of Fig. 7.

The means for feeding or pushing the portion from platform 46 into the carton comprises a pusher member or arm 64 with a blade portion 65 which is movable within U-shaped member 59 and behind the portion of material "p" (see Figs. 7 and 10) to push it from said platform, and said member 64 is secured to a shaft 66 which is slidably and rotatably mounted in end flanges 67 of a bracket 68 fastened on the side of housing 16 (see Figs. 4 and 11).

Figure 5:
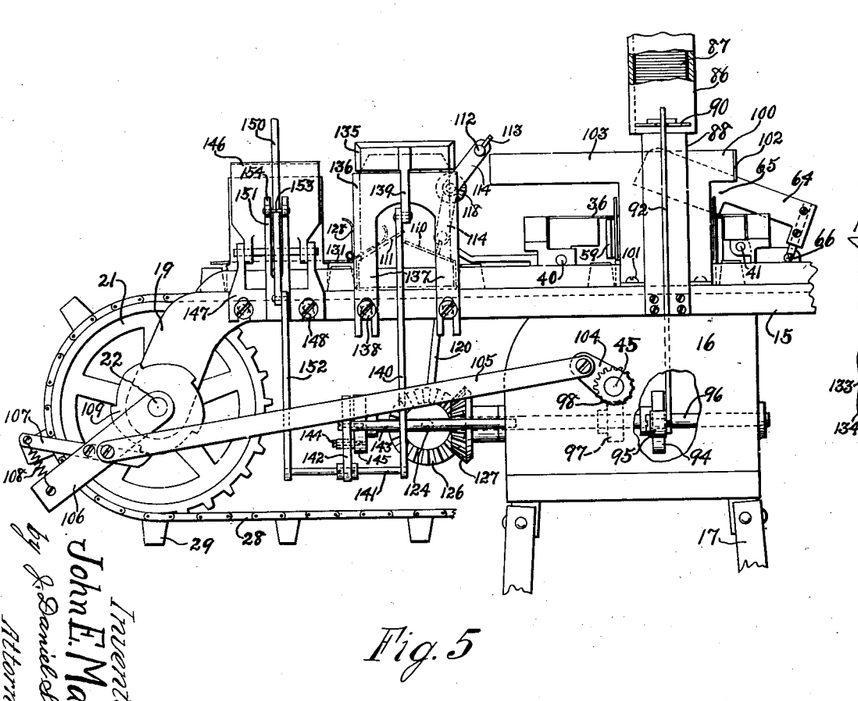
Fig. 5 is an enlarged partial elevational view, taken from the opposite side of Fig. 1, showing in full lines the carton closing mechanism at the beginning of the closing operation.

The means for driving or reciprocating the shaft 66 and the pusher member 64 includes a lever 69 attached at its upper end to shaft 66 and fulcrumed with a pivot 70 on housing 16 (see Fig. 4). A roller 71 on a cam arm 72 secured on a shaft 73 engages an intermediate cam finger 74 on said lever to move shaft 66 rearward, and said roller 71 engages a lower cam finger 75 on said lever to move shaft 66 forward. A bevel gear 76 on the main drive shaft 45 meshes with bevel gear 78 on shaft 73 to rotate the latter and actuate cam arm 72. A lever arm 79 is fastened on and extends transversely from shaft 66 (see Fig. 11) and has a depending finger 80 which normally slides along the side of bracket 68 but which drops in a notch 81 in said bracket 68 to swing arm 79 and shaft 66 and thereby raise pusher blade 65, as indicated in Figs. 5 and 10, for a sufficient length of time to permit the portion of material with the platform to pass underneath the knife as they travel from the casing to the carton. A curved lever rod 82 (see Figs. 7 and 11) is swung on its fulcrum 83 provided on the side of housing 16 when the inner end 84 is struck and moved downward by a lug 85 on drum 44, and the upper end 86 of said rod 82 thereupon engages and raises lever arm 79 to move its finger 80 out of notch 81 and to move pusher blade 65 downward into position for pushing the portion "p" from the platform into the carton.

Figures 7, 8:
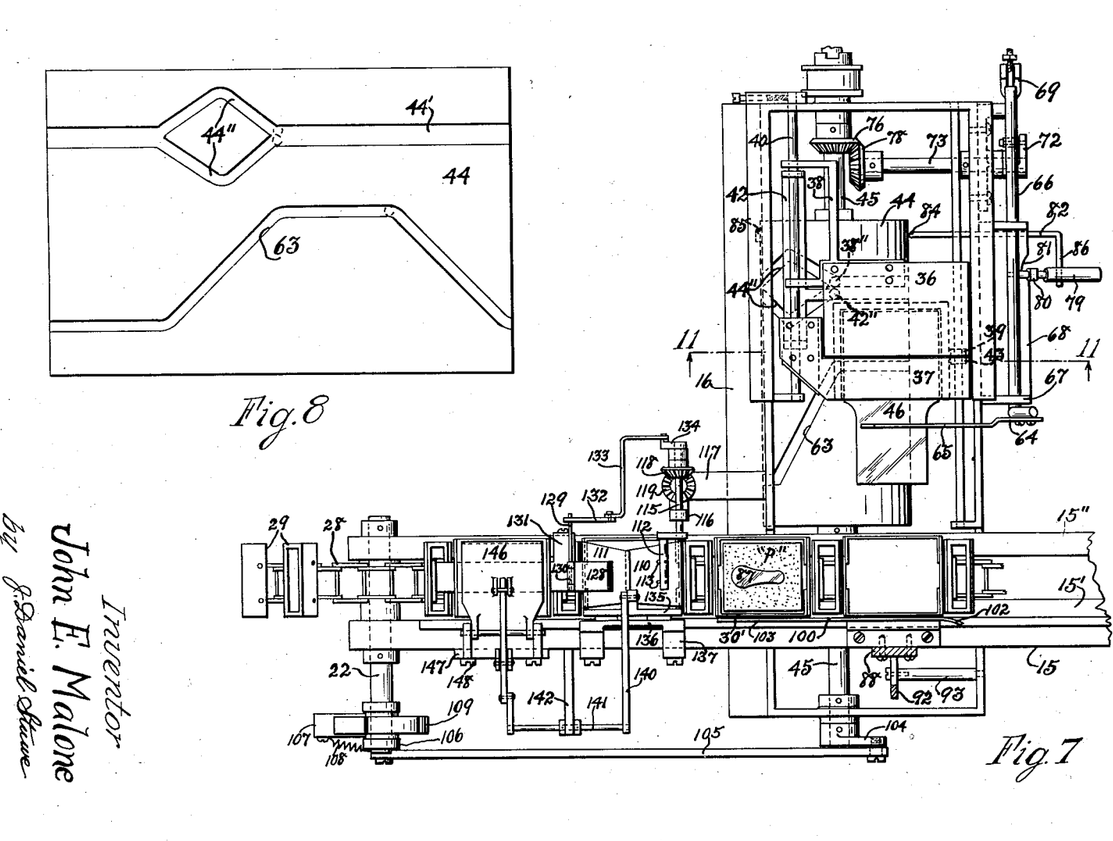
Fig. 7 is a partial plan view of the machine.
Fig. 8 shows a development of the drum with the slots for actuating the arms which operate the knives or portion separating means and also the pusher blade or discharging means.
Figure 9:
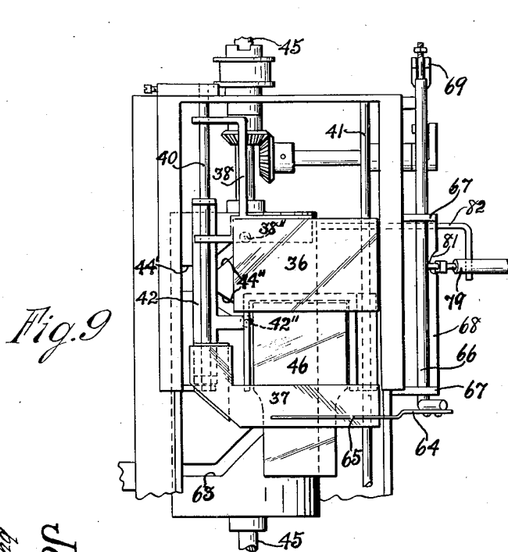
Fig. 9 is a partial plan, showing the knives separated.

After the portion of material has been pushed from the platform 46 into the carton 30 a spoon supplying means adds a spoon thereto, which may be a cardboard spoon, and this spoon supplying means preferably includes a box or holder 86 containing a stack of spoons 87 and being mounted above the carton 30 by means of a bracket 88 which extends from the track frame 15 (see Figs. 4 and 7). A slot 89 of the size of a spoon is provided in one side of said box, and a pusher plate 90 enters through a mouth 91 at the opposite side of said box to push a spoon through said slot 89 so that it will drop onto the portion of material "p" in the open carton. Said plate 90 is reciprocated by a lever 92 fulcrumed on a post 93 mounted in housing 16, and said lever is actuated by a cam plate 94 engaging a roller 95 at the lower end of said lever 92, said cam plate is mounted on a shaft 96 which is journaled in housing 16 and carries a gear 97 driven by a gear 98 secured to the main shaft 45, said gears being preferably 45° gears, as shown in Fig. 4.

A guard plate 100 is provided and is arranged on track frame 15, as with elements 101 adjacent spoon box bracket 88, and has a curved guide lip 102 at its receiving side and a guide arm 103 at the opposite side for guiding and bracing the top flap 30' of the carton.

The means for operating the conveyer chain 28 and therewith the cartons in a step by step movement comprises a crank arm 104 secured on drive shaft 45 and having a link 105 pivoted thereto and to a lever 106 which is fulcrumed on shaft 22 and carries a pawl 107 urged by a spring 108 into engagement with the teeth of a small sprocket 109 secured on shaft 22, thus intermittently operating shaft 22 and the large sprocket 21 with chain 28 to move the carton step by step over the machine.

The means or mechanism for closing the carton comprises separate means for folding down the rear end flap 110, and for folding down the front end flap 111, also means for creasing or bending over the end lip or flange 30" on the main flap 30', and means for folding down said main flap over the end flaps and then tucking in said folded end lip into the carton.

The means for folding down the rear end flap 110 comprises an operating arm 112 provided with fingers 113 and mounted on a crank 114 which rotates with a horizontal shaft 115 journaled in the yoke arms 116 of a bracket 117 extending laterally from housing 16 (see Fig. 7). A gear 118 on horizontal shaft 115 drives a gear 119 on a vertical shaft 120 which is journaled and supported in the bracket 117. The lower end of said shaft 120 extends through a yoke 121 and carries a gear 122 driven by a gear 123 secured to a shaft 124 which is mounted in the arms of said yoke 121 and in a supporting bracket 125 which extends from housing 16. A gear 126 on the end of shaft 124 is driven by a gear 127 mounted on shaft 96 journaled in housing 16.

Figure 6:
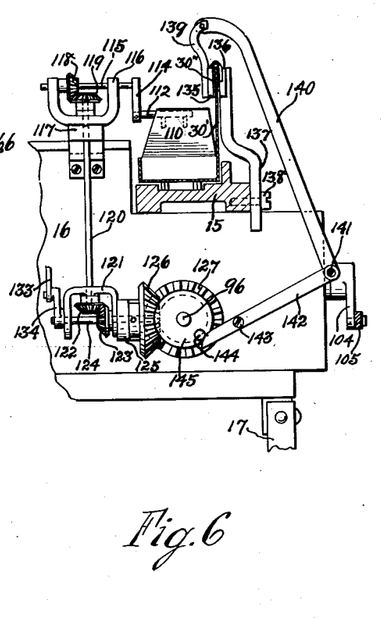
Fig. 6 is an enlarged partial vertical section on line 6—6 of Fig. 1, showing the carton closing mechanism in an intermediate position.

The means for folding down the front end flap 111 of the carton comprises a swingable plate or hand 128 secured on a rod 129 journaled in the ear or curled end 130 on a bracket plate 131 which is mounted on frame 15, and said rod 129 is actuated by a crank arm 132 connected by means of a curved link 133 to a crank 134 secured to shaft 124 (see Fig. 6).

The means for bending over the end lip 30" on the main flap 30' of the carton comprises a swingable jaw plate 135 pivoted on a stationary jaw plate 136 which is mounted with legs 137 adjustably on frame 15, by the use of screws 138 engaging in slots in said legs 137. An arm 139 is secured to plate 135 and is actuated by a link 140 connected to said arm and to a horizontal shaft 141 extending through the end of a lever 142 which is fulcrumed on a supporting post 143 extending laterally from housing 16. The free end of lever 142 is actuated by a pin 144 extending from the face of a disc 145 fastened on the outer end of rotating shaft 96, outward of ear 127 (see Fig. 5). The rotation of shaft 96 and disc 145 will thus intermittently actuate lever 142 by pin 144 and thereby swing arm 139 and plate 135 in order to crease or bend lip 30″ on flap 30′.

Figures 1, 2, 3:
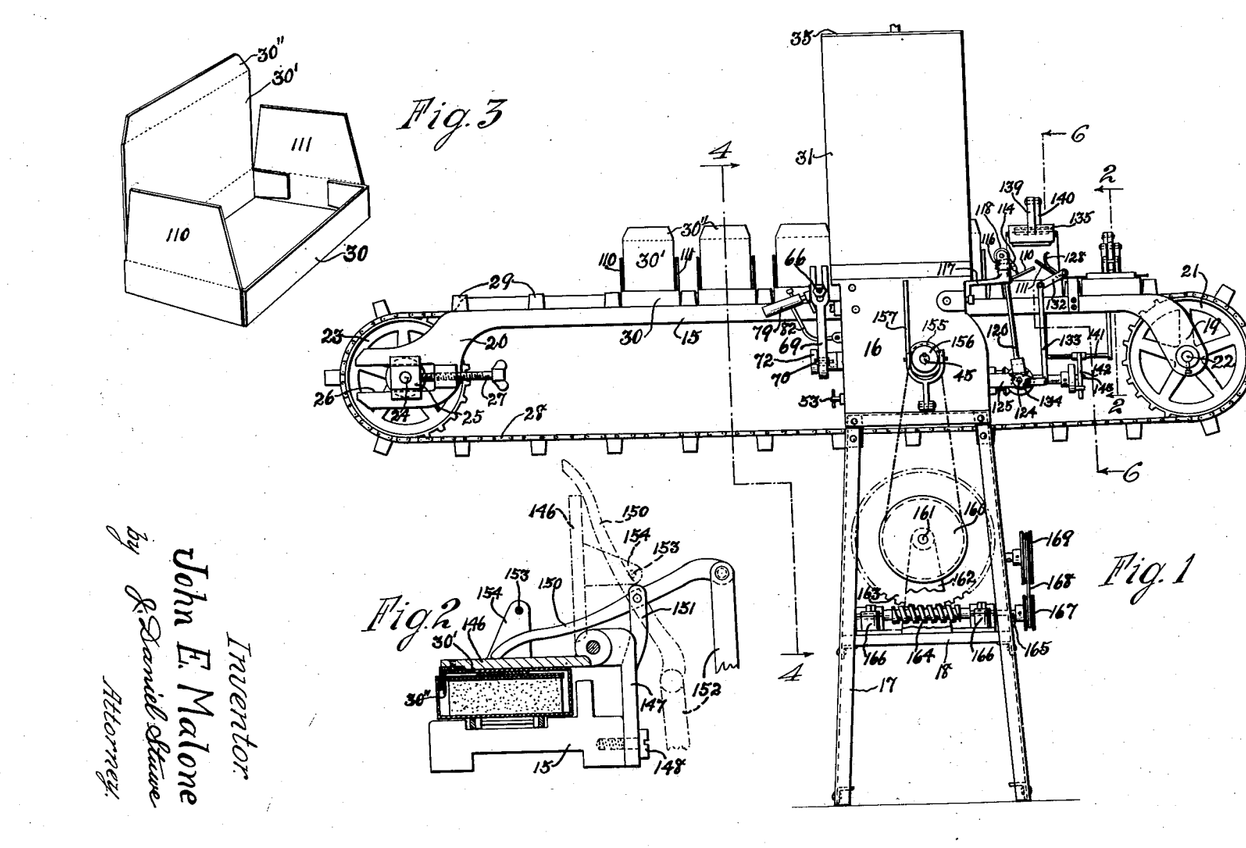
Fig. 1 is a side elevation of the machine embodying a certain form of my invention.
Fig. 2 is an enlarged vertical section on line 2—2 of Fig. 1, showing means for closing the carton cover.
Fig. 3 is a perspective view of the carton.

The means for folding down flap 30′ comprises a swingable plate 146 pivoted on a bracket member 147 adjustably mounted on frame 15 by means of screws 148 engaging in slots in said member 147. A lever 150 is fulcrumed on an arm 151 extending from bracket 147, and is actuated by a crank arm 152 fastened on horizontal shaft 141. The free end of lever 150 engages plate 146 to press it downward (see Fig. 2) in order to close the top flap 30′ of the carton and to tuck in the end lip 30″, inward of the front wall of said carton. As the free end of the lever moves upward it engages a pin 153 in ears 154 extending from plate 146, and thereby lifts said plate vertically upward by the upward movement of the free end of said lever, as indicated in dotted lines in Fig. 2.

The means for driving the mechanism of the machine comprises a pulley 155 rotatably mounted on drive shaft 45 and provided with a clutch portion 155′ engagable by a clutch member 156 which is slidably mounted on said shaft 45 and keyed thereon to rotate therewith. This slidable clutch member is operated by a lever 157 fulcrumed on a bracket 158 extending from housing 16. A belt 159 travels over pulley 155 and over a pulley 160 secured to shaft 161 mounted in frame legs 17 and in bracket members 162 extending from cross bars 18. A gear 163 is secured to said shaft and is driven by a worm 164 on a shaft 165 journaled in bearings 166 and driven by a pulley 167 actuated by a belt or cable 168 driven by a pulley 169 attached to the shaft 170 of a driving motor 171 which is mounted by means of brackets 172 on cross bars 18.

What I claim as my invention and desire to secure by Letters Patent is:

1. A machine comprising means for containing a mass of material, knives on which said mass rests when in closed position, a supporting member beneath said knives on which said mass moves when said knives are separated, arms on said supporting member and said knives and a drum with slots for receiving and actuating said arms to operate said knives and supporting member for cutting a portion from said mass and moving said portion by means of said supporting member.

2. A machine comprising means for containing a mass of material, cutting members normally resting beneath said mass, a supporting member located beneath said cutting members, means for moving said cutting members from the path of said mass to let it move onto said supporting member, and thereafter to move said cutting members to cut the supported portion from said mass, means for moving said supporting member with the supported portion laterally away from said cutting members and mass, and means for moving said supporting member with the supported portion downward during said lateral movement.

3. A machine comprising means for containing a mass of material, cutting members placeable beneath said mass, a supporting member movable beneath said cutting members for supporting the mass when the cutting members are separated, arms on said cutting members and supporting member, a slotted drum for moving said arms to actuate said cutting members and cut a portion from said mass of material and to move said supporting member with said portion, and means dependent upon the movement of said drum for moving said portion from said supporting member at a delivery point.

4. A machine comprising means for containing a mass of material, means for cutting a portion from said mass, means for conveying said portion to a delivery point, a pusher blade and rotating and reciprocating means for swinging said blade back of said portion, and means for sliding said blade and reciprocating means longitudinally of said conveying means to discharge said portion therefrom.

5. A machine comprising means for containing a mass of material, means for cutting a portion from said mass, means for supporting and conveying said portion to a delivery point, a pusher blade, a reciprocating and rotating shaft with operating means for swinging and reciprocating said blade to discharge said portion from said supporting means, and lever means for reciprocating and for rotating said shaft.

6. A machine comprising means for holding a mass of material, means for supporting the lower end of said mass, means for cutting a part from said mass which rests on said supporting means, means for operating said supporting means, a pusher member and means for swinging and reciprocating it to move said portion from said supporting means, and rotating means for actuating said cutting means, said supporting means, and said pusher member in proper order.

7. A machine comprising means for holding a mass of material, means for supporting the lower end of said mass, means for cutting a part from said mass which rests on said supporting means, a pusher member and means for swinging and reciprocating it to move said part of material from said supporting means at a delivery point, arms on said cutting means and on said supporting means and on said swinging means, and a drum with means for operating said arm and connected means in proper order by the rotation of said drum.

8. A machine comprising means for containing a mass of material, means for separating a portion from said mass, means for conveying said portion from said containing means, a member for pushing said portion from said conveying means, a shaft mounted on said machine to swing and to reciprocate said member, an arm on said shaft movable to swing said member upward so that said portion may pass thereunder, and lever means to raise said arm and swing said member down onto said conveying means for moving said portion therefrom.

9. A machine comprising means for containing a mass of material, means for separating a portion from said mass, means for conveying said portion from said containing means, a member for pushing said portion from said conveying means, a shaft for swinging and reciprocating said member, and a lever and cam means to reciprocate said shaft and said pushing member.

10. A machine comprising means for containing material, means for separating a portion from said material, means for conveying said portion from said containing means, means for pushing said portion from said conveying means, a gravity actuated arm for swinging the last said means, a lever for swinging said arm, and a rotating member for actuating said lever.

11. A machine comprising means for containing material, means for separating a portion from said material, means for conveying said portion from said containing means, a member for pushing said portion from said conveying means, reciprocating and swinging means for actuating said pushing member, an arm and a lever for swinging the last said means, arms on said conveying means and on said separating means, and a drum with a lug and with slotted means for operating said lever and said arms by rotation of said drum.

12. A machine comprising a housing and means thereon for containing a mass of material, means for cutting the lower portion from said mass, means for supporting and conveying said portion, the last said means including a platform movable beneath said mass and cutting means, a frame reciprocating with said platform on said housing, shafts with connecting means slidable in said frame, track means along which said connecting means travel during reciprocation of said frame, and means for adjusting said track means to determine the thickness of said portion.

13. A machine comprising a housing and means thereon for containing a mass of material, means for cutting the lower portion from said mass, means for supporting and conveying said portion, the last said means including a platform on which said portion rests and being movable away from said cutting means and said mass, a frame reciprocating with said platform on track means on said housing, shafts attached to said platform and slidable in said frame but reciprocating therewith, and means for operating said shaft and said frame to lower and to move said platform away from said containing means.

In testimony whereof I have signed my name to this specification.

JOHN E. MALONE.